Figure 1:
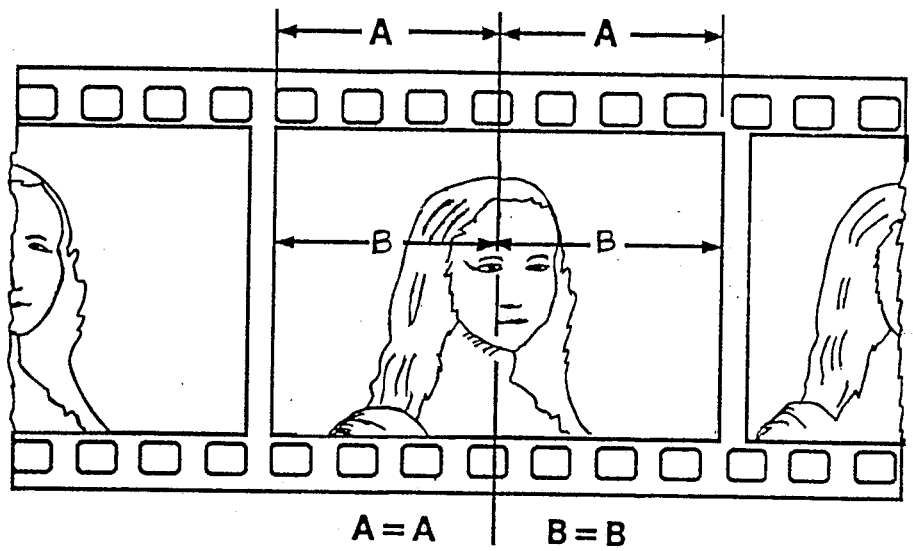

United States Patent [19] 
Mowat

[11] Patent Number: 4,763,175
[45] Date of Patent: Aug. 9, 1988

[54] APPARATUS AND METHOD FOR FILM PIECES

[76] Inventor: Kenneth R. Mowat, P.O. Box 11335, Station H, Nepean, Ontario, Canada, K2H 7V1

[21] Appl. No.: 782,000

[22] Filed: Sep. 30, 1985

[30] Foreign Application Priority Data

Oct. 4, 1984 [CA] Canada .................................. 464223

[51] Int. Cl.$^4$ ............................................. G03B 27/62
[52] U.S. Cl. ....................................... 355/75; 355/72; 355/79
[58] Field of Search ....................... 355/72, 75, 78, 79, 355/125, 126, 127

[56] References Cited

U.S. PATENT DOCUMENTS 2,236,197  3/1941  Moore ..................................... 355/72
2,418,226  4/1947  Haff ........................................ 355/75
3,353,281  11/1967 Schulze .................................. 355/79
3,814,518  6/1974  Wichers ................................. 355/75

Primary Examiner—Monroe H. Hayes
Attorney, Agent, or Firm—Pascal & Associates

[57] ABSTRACT

Devices for the fabrication, handling and critical positioning of pieces (or chips) of film which are to be processed by image compositing into special effects type slides. The devices are comprised of a chip handling tool having a grasping sector for maintaining the chip immovable relative to the tool, a plurality of chip retainers each comprising a placement reference guide for guiding the tool to a predetermined and invariably specific accessing and grasping sector of the chip, whereby when the jaws of the tool are firmly engaging with a chip the parameters of position orientation between the chip and the jaws define an unique location interrelationship between the chip and the jaws, such that when the chip is removed from a first chip retainer by the tool, and the jaws position referenced within the guide of a second chip retainer, the film piece is restored to a location and position relationship relative to the second chip retainer similar to that of the first chip retainer. A contact or projection printer, a chip cutter and chip dispensing and storage container use the principles of the invention.

30 Claims, 12 Drawing Sheets

APPARATUS AND METHOD FOR FILM PIECES

This invention relates to devices for the fabrication, handling, and critical positioning of individual, registration-frame-size "pieces" (or "chips") of 35 millimeter or other size, still (i.e. as opposed to motion picture) photographic film urder total darkness conditions.

It is conventional practice in certain photographic, imagemaking processes for an image-carrying layer of film to be placed in tight contact with a light sensitive layer of film; and by way of transmitted light through the image-carrying layer, cause that image to be printed onto the light sensitive film layer.

This basic contact printing method, once representing the only photographic reproduction process, declined in general use as a routine printing method (and was replaced by projection printing) as the image-carrying materials became smaller than the required reproduction size. One of the specialized fields still relying heavily upon contact printing is the special effects processes of image-compositing and manipulation. This involves a number of image-carrying layers of film being separately printed onto the same light sensitive film layer by means of a series of exposures. In practice, the position-referencing (or registration) of the various images is accomplished by means of punched holes in the margin of all the elements being used. These holes are aligned to and bottomed onto registration pins during each exposure.

With the need to change various image-carrying layers for each successive exposure, and to align all elements onto registration pins in total darkness, it follows that the larger the film size format employed, the less demanding are the handling procedures. As a result, contact printing using small format film sizes, such as single-frame-size pieces of 35 mm film, has not been extensively developed, particularly in the field cf multiple-image and multiple-exposure special effects, image-manipulation and compositing. The positioning of 35 mm film chips under total darkness conditions requires: 1) discreet, fingertip-touch sensing for the location of the film's perforation holes; (2) aligning these perforation holes in close tolerance position above raised registration pegs, also located by fingertip-touch sensing; and, (3) bottoming the perforation holes onto these pegs by fingertip pressure applied to closely limited safe areas adjacent to the perforation holes.

Nevertheless, 35 mm, registration-frame-size film chips are widely used as the image-carrying components for such processes. However, largely to circumvent the size-related handling obstacles, optical printing is employed as a means of reproduction, instead of contact printing.

For this "optical printing" method of reproduction, the 35 mm, image-carrying film chips are positioned in registation (much as they would be for contact printing purposes) under normal lighting conditions; light is transmitted through the 35 mm film chips; and the resultant image is photographed by a critically positioned specialized camera onto 35 mm film. So it is that what might be called "optical contact printing from a distance", with its elaborate technology, has been employed to solve the handling problems associated with 35 mm contact printing. As a result, "cameraless imagemaking" by 35 mm contact printing is not widely developed as a commercially viable photographic process.

The obstacles associated with contact printing in the 35 mm, single, registration-frame-size format center around three factors. First, the single-frame chips of unexposed film are not supplied by manufacturers in a ready-to-use form. As a result, such chips must be fabricated by the user from the customary, roll film format sources under total darkness conditions by improvised methods. Second, when such chips are prepared, they are not inherently easily accessible. Their random storage in light-tight containers introduces handling problems at the outset of any 35 mm, contact printing procedure. Third, the manual handling and registration-positioning of 35 mm film chips, with the inherent skill and time demands, and the high margin for error under total darkness conditions, further erode the viability of 35 mm, contact printing techniques. Although "35 mm, contact printing" is referred to, other associated, 35 mm processes and devices, are to be understood as being addressed. Projection printing is one such particularly relevant process—i.e. exposing images directly onto a film chip, positioned in a 35 mm printing frame device, by means of projection from an enlarger. Thus reference to contact printing herein should be construed as including projection printing.

This invention systematically addresses each of these three problems and offers specific solutions, in each instance, by resort to three embodiments of a single principle. These solutions provide that the single, registration-frame chips of film need not be manually touched by hand at any time, neither by discreet, fingertip-touch sensing; nor by coarser contact such as referencing by thumb and index finger to the film's edges for purposes of conveyance.

Since the 35 mm, contact printing device is the central component around which all solutions relating to both equipment and procedures must be defined, the embodiment of this invention that relates to the contact printer will be dealt with first. This first embodiment, in turn, will dictate the parameters of the invention's embodiments relating to: (1) the fabrication of single, registration-frame-size film chips from roll supply sources; and, (2) the dispensing of these chips in an individual manner commensurate with customary production efficiency requirements.

It is not intended that the invention should be limited to the use of 35 mm film. Reference is made herein to 35 mm films and associated apparatus as a matter of example and to avoid repetition. However it is intended to be understood that other small and medium film size formats such as 65 mm and 70 mm, with apparatus to accommodate the same, are included. All reference to 35 mm film should be construed as relating also to these and all other sizes of film to which the principles of this invention could be adapted.

Figure 5:
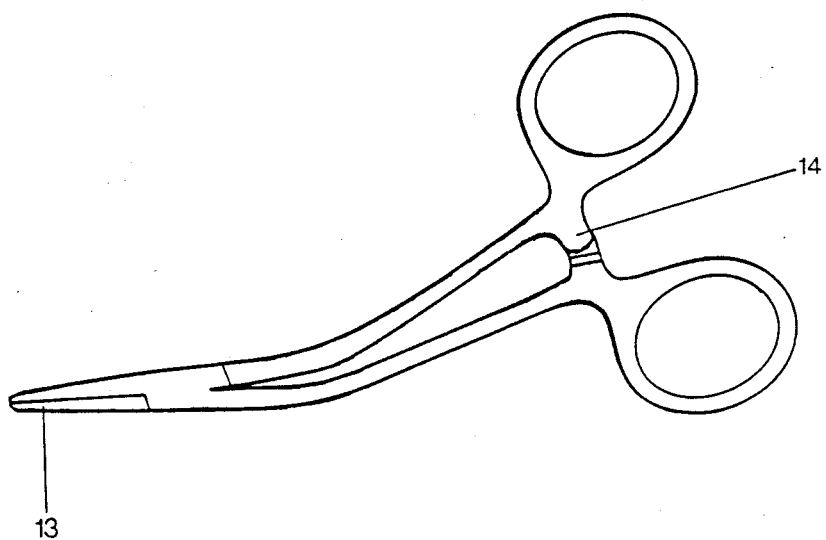
Figure 2:
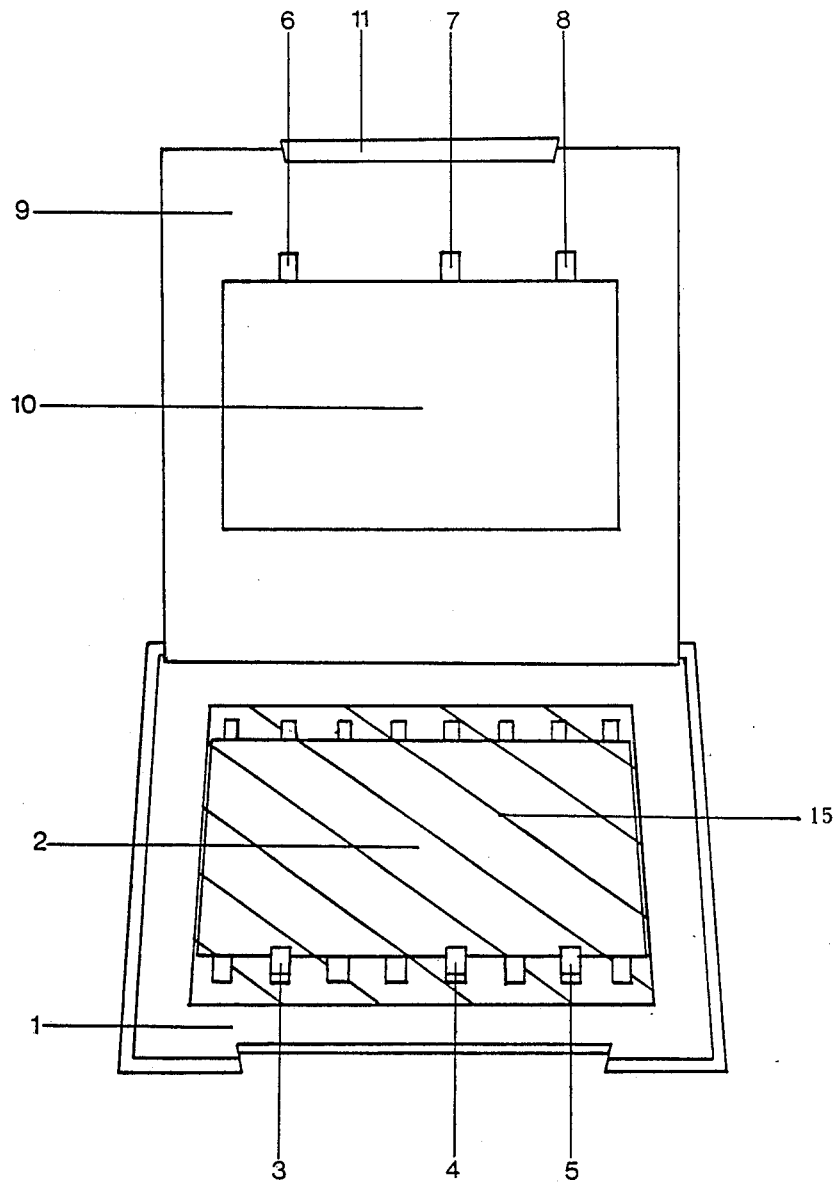
Figure 3:
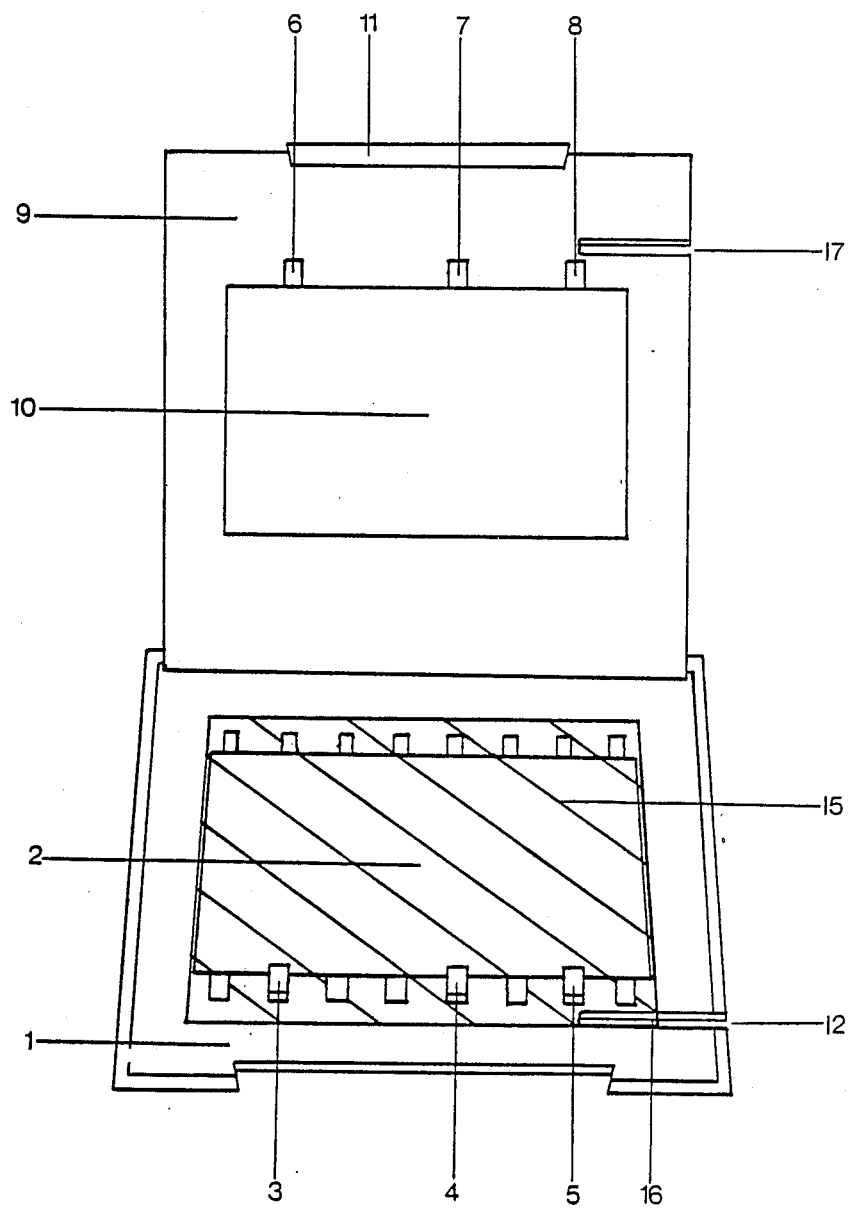
Figure 4:
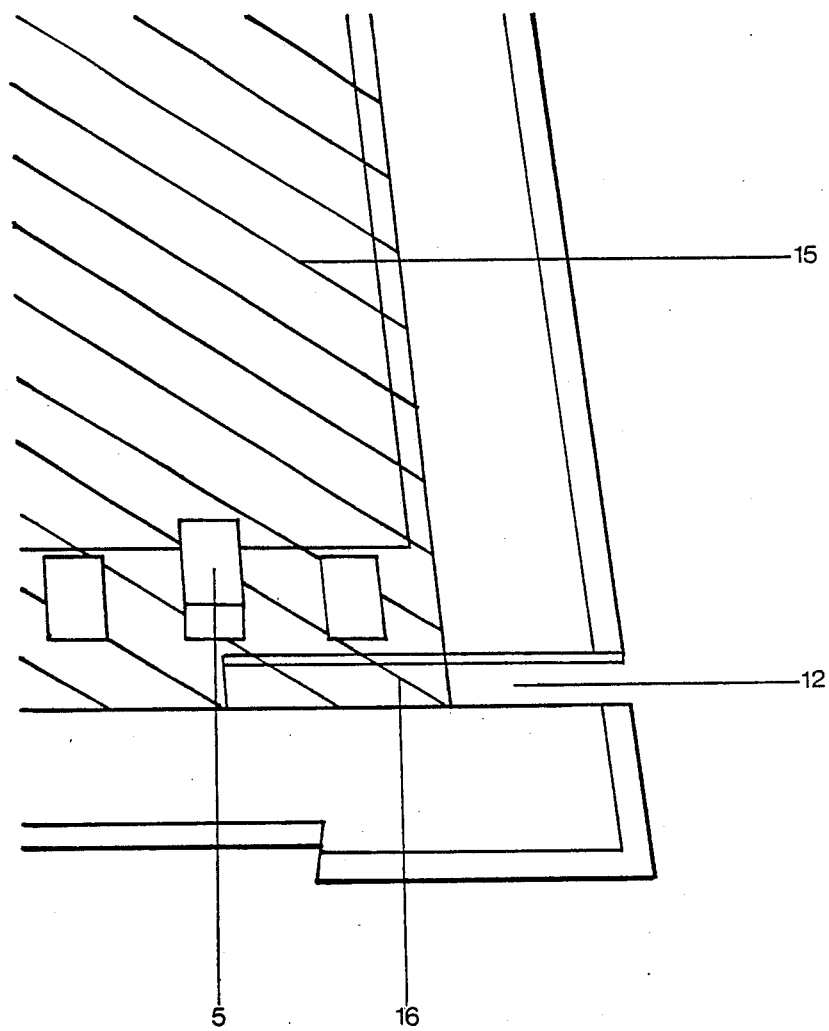
Figure 6:
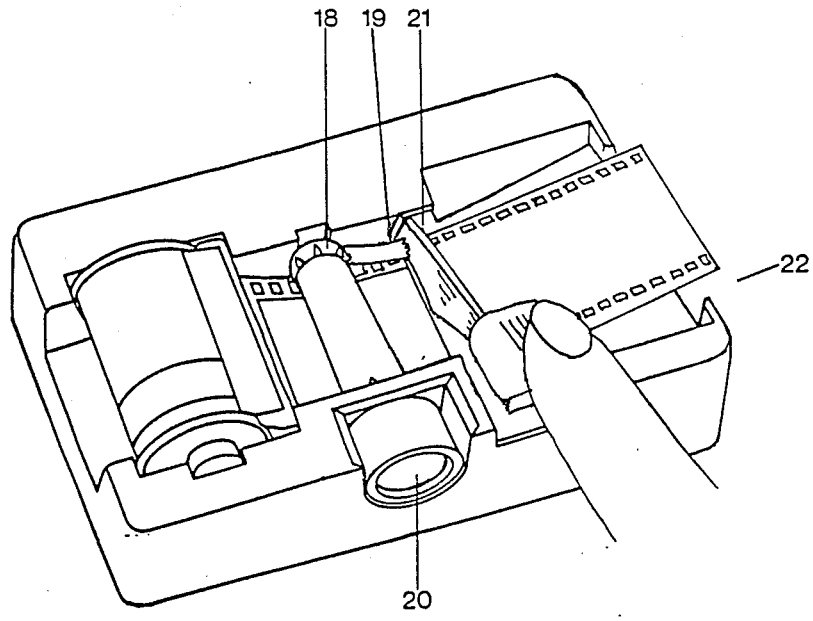
Figure 8:
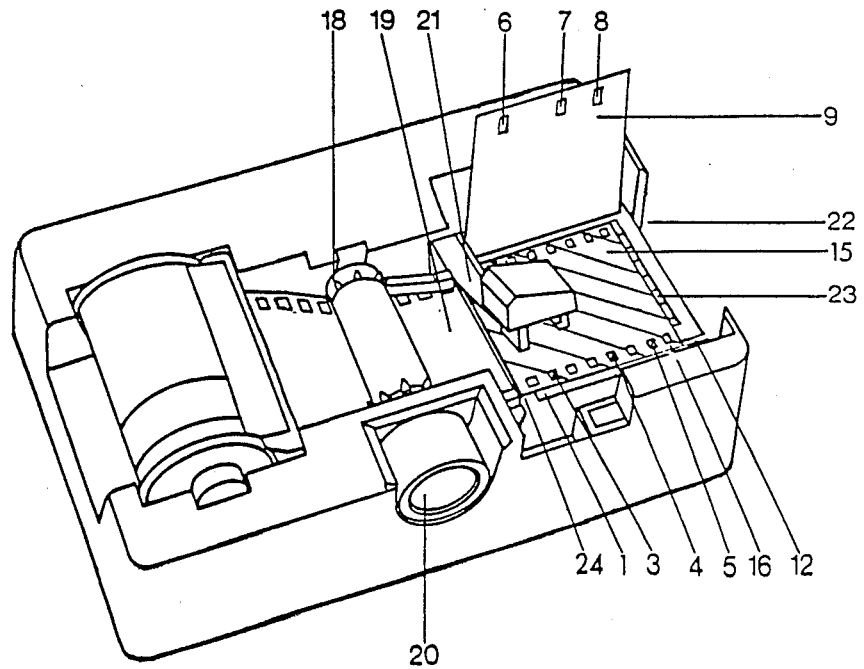
Figure 7:
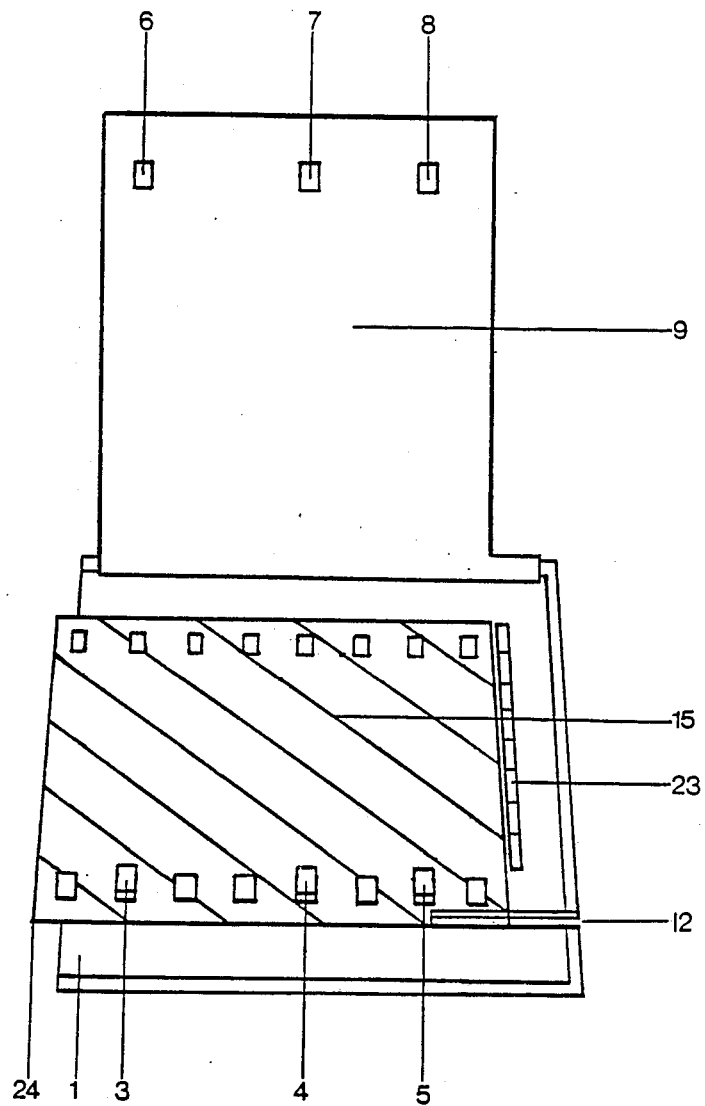
Figure 9:
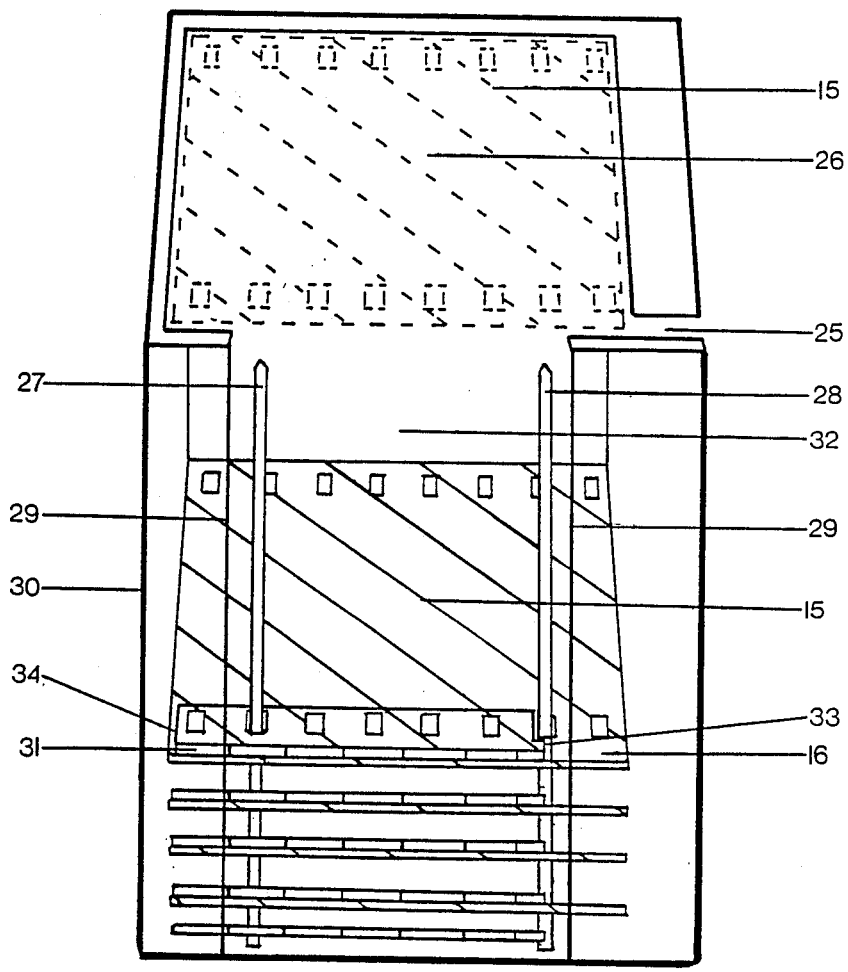
Figure 10:
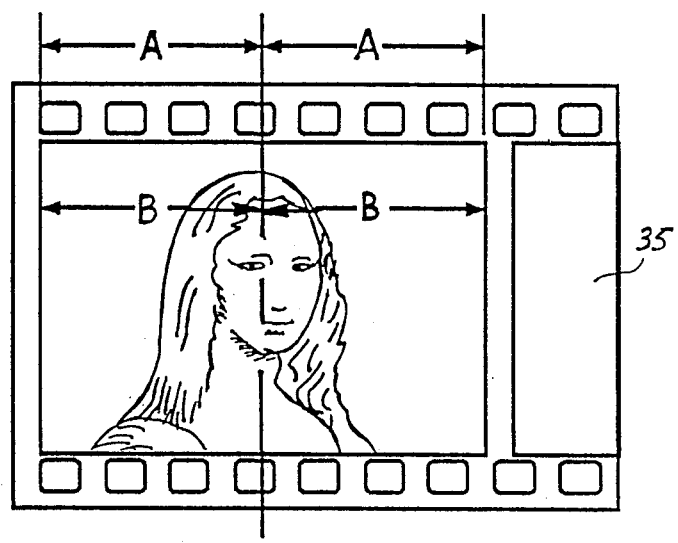
Figure 14:
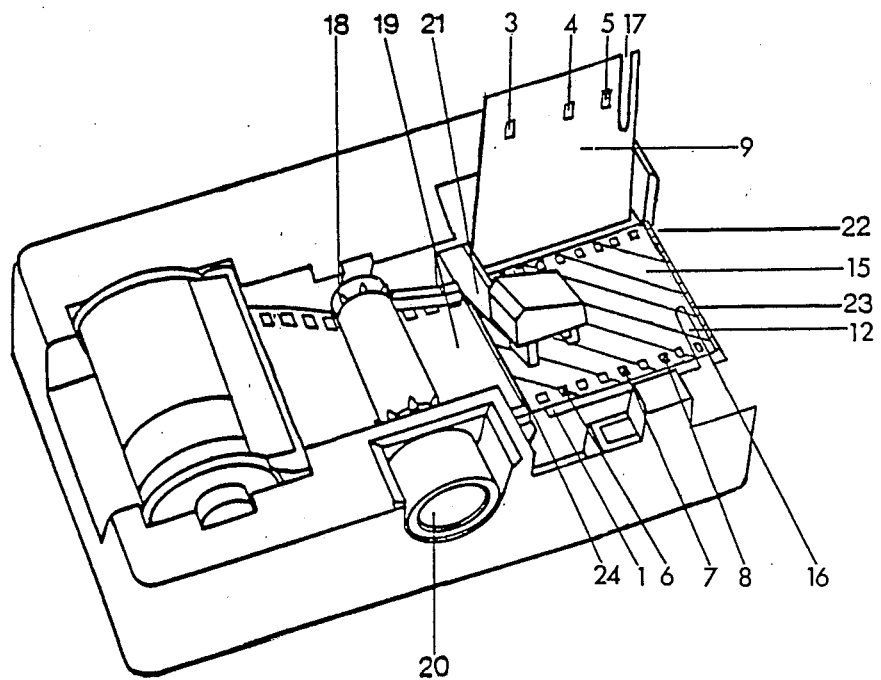
Figure 11:
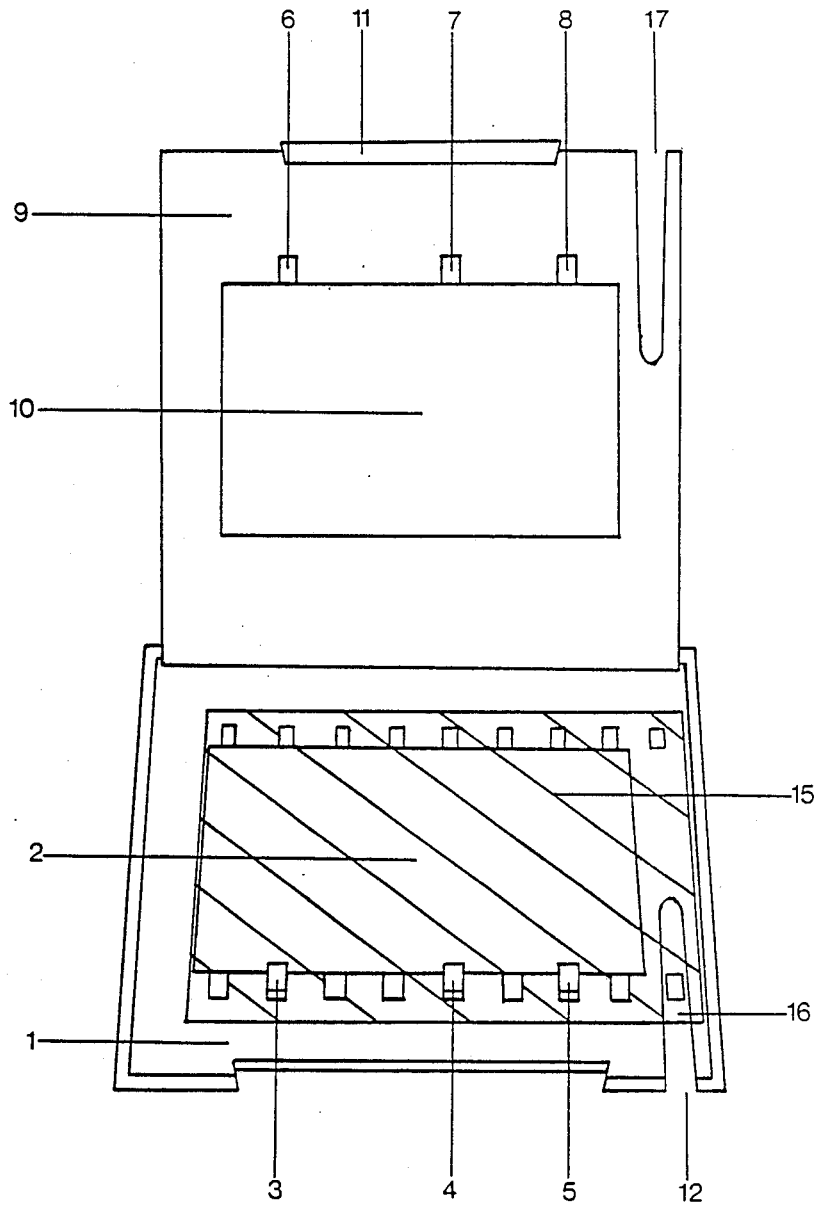
Figure 12:
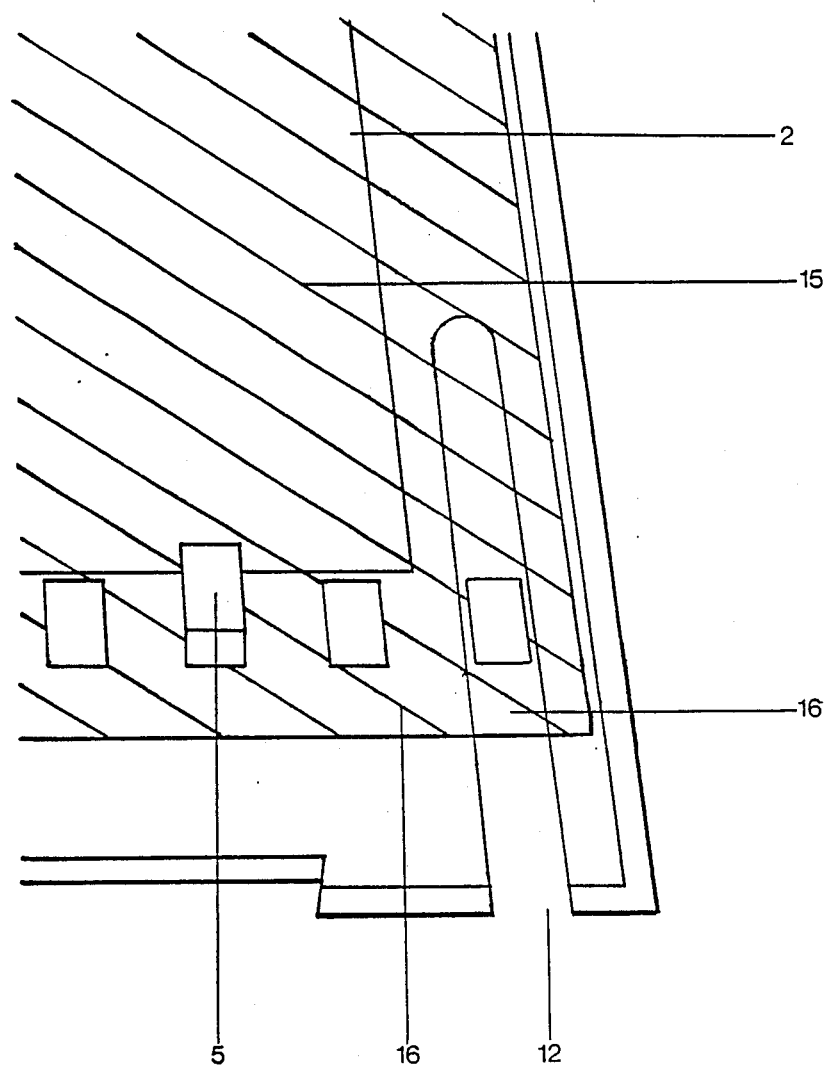
Figure 13:
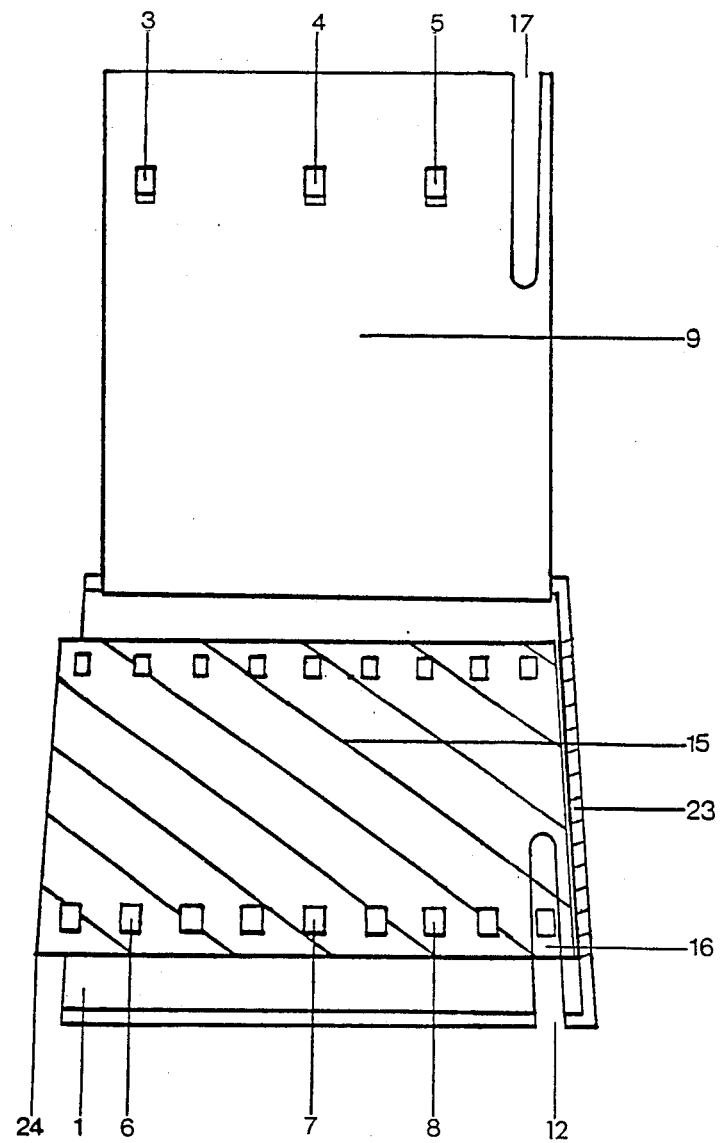
Figure 15:
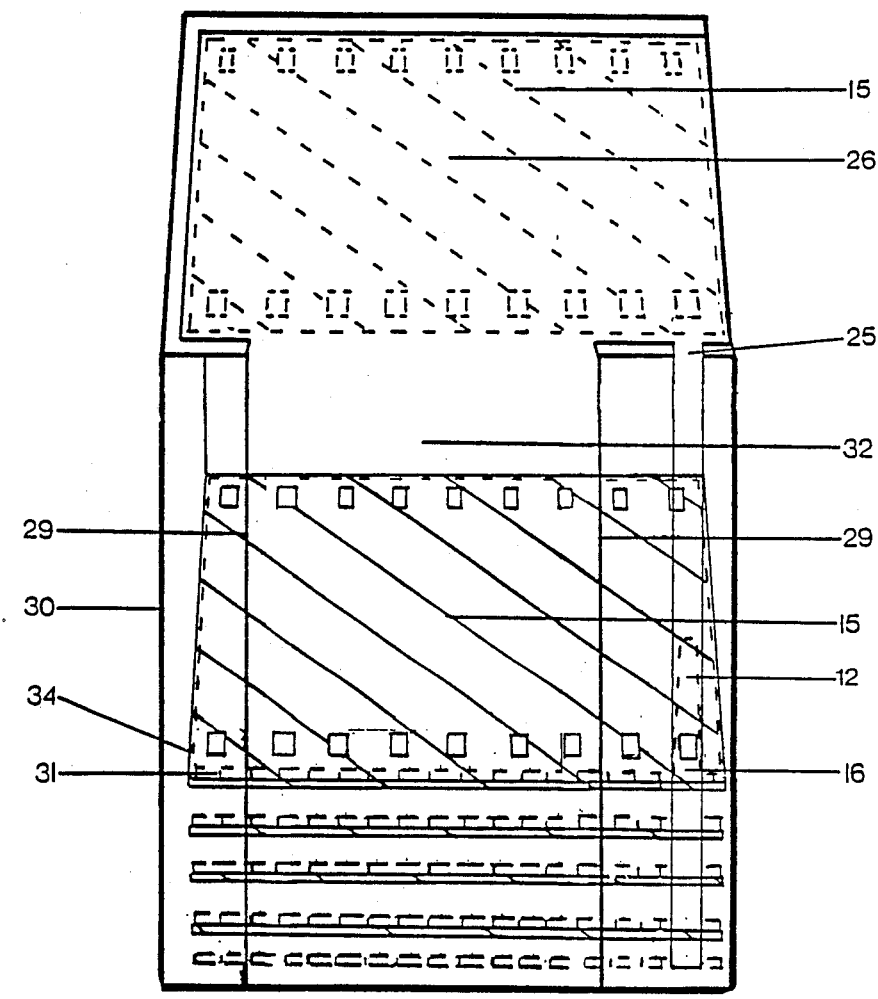

In drawings which illustrate embodiments of the invention and pertinence thereto, FIG. 1 illustrates the industry's accepted, registration-frame, configuration standard for film, FIG. 2 illustrates in schematic view a typical 35 mm, registration-frame, contact printing device, FIG. 3 illustrates this invention's modification of the customary contact printing device, FIG. 4 illustrates a detail of a section of FIG. 3 highlighting the modification, FIG. 5 illustrates the surgical-type, clamping forceps used as part of the invention, and appears out of consecutive order on the same page as FIG. 1, FIG. 6 illustrates a typical, 35 mm, transparency frame cutter and slide mounting device, FIG. 7 illustrates adaptions of the modified contact printing device of FIG. 3, FIG. 8 illustrates the adapted device of FIG. 7 affixed to the device of FIG. 6, FIG. 9 illustrates a storage and dispensing unit for unexposed, 35 mm film chips FIG. 10 illustrates a film chip, FIG. 11 illustrates a contact printing frame, FIG. 12 illustrates an enlarged portion of FIG. 11, FIG. 13 illustrates a component of a film cutter, FIG. 14 is an isometric view of a chip cutter, and FIG. 15 is a storage and dispensing unit.

The basic components of an apparatus used as a 35 mm, registration-frame, contact printing device (hereafter referred to as "contact printer") are essentially those of the registration-type, 35 mm, transparency (or slide) mounting units commonly employed in the audio visual industry. In fact, such slide mounts (FIG. 2) have routinely been used as improvised, rudimentary contact printers for single frames of 35 mm film.

The contact printer illustrated comprises a bottom, base component 1 containing a window 2 and raised registration studs or pegs 3, 4, 5 (hereafter referred to as "pegs") onto which certain of the film chip's perforation holes are aligned and bottomed. The recessions 6, 7, 8 in the upper cover component 9 accommodate the pegs 3, 4, 5. During the cover's 9 closing cycle, the close-fitting of the recessions 6, 7, 8 around the pegs 3, 4, 5 firmly bottom and secure the perforation holes relative to the pegs 3, 4, 5. In the closed position, the window 10 of the upper cover 9 tightly engages with the window of the lower component 1, when secured in position by the latching mechanism 11. As a result of this characteristically tight engagement between the upper and lower window members 2, 10, and the critical position (or registration) facility afforded by the pegs 3, 4, 5, the slide mounting unit demonstrates the ideal, functional requirements demanded of a contact printer. Thus, if a layer of light sensitive film 15 is positioned onto the pegs 3, 4, 5 and "sandwiched" with a similarily positioned layer of image-carrying film, when light is directed through the image carrying layer, such images are photographically printed (or transferred) onto the light sensitive film layer.

When a single, registration-frame-size, 35 mm film chip, as defined in FIG. 1, (hereafter referred to as a "film chip") is positioned and bottomed onto the pegs 3, 4, 5 of a contact printer, it has acquired a specific and unique alignment and positioning relationship not only to the pegs, but also to the body 1 of the contact printer on which the pegs 3, 4, 5 are formed. It follows, if the alignment relationship of the positioned film chip 15, solely in reference to the body 1 of the contact printer, were re-established in relationship to the body 1 of a second such identical contact printer, the perforation holes of the film chip 15 would inherently exhibit an identical alignment relationship with the pegs 3, 4, 5 of the second contact printer as they had exhibited with the first printer. This being the case, a component of the contact printer's body 1 (other than the pegs 3, 4, 5) can be referenced to a component of the film chip (other than the perforation holes) and this secondary referencing alone re-establishes the positioning relationship between the pegs 3, 4, 5 and perforations whenever this secondary reference is established. The functional form of an embodiment of this principle is illustrated in FIGS. 3, 4 and 5.

The slot channel 12 fashioned into the bottom, base component 1, of the contact printer, allows size-to-size fitting jaws 13 of a specialized clamp, e.g. a surgical-type instrument with a locking mechanism 14, referred to herein as forceps having locking jaws, to be inserted and rigidly clamped orto the accessible, outer corner 16 of the film chip 15 immediately adjacent to peg 5. The mated slot channel 17 in the upper cover component 9 allows this clamping to be undertaken while the cover 9 remains secured in the closed position.

When the jaws 13 of the forceps are clamped onto the corner 16 of the film chip 15, they become uniquely referenced to both the film chip and the slot channel 12. It follows, therefore, since the film chip 15 is already uniquely position-referenced to the slot channel 12, when the jaws 13 remove the clamped film chip 15, from its position on the pegs 3, 4, 5 (upon opening the upper cover 9), the film chip's position-referencing to the slot channel 12 is retained in its position-relationship to the forceps jaw 13. Subsequently, when the jaws 13 carrying the film chip 15 are re-inserted into the slot channel 12, the perforation holes regain their identical position-relationship to the pegs 3, 4, 5 that they formerly exhibited. (The position of the perforation holes will be on top of the pegs 3, 4, 5. Closing and securing the upper cover 9 bottoms the perforation holes onto the pegs 3, 4, 5.) The critical positioning of the perforation holes of the chip 15 onto the pegs 3, 4, 5 has been achieved without resort to manual referencing (by fingertip-tough sensing) in any manner.

It can be concluded, a particular position-referencing between the corner of the film chip 16, and the jaws 13 of the forceps represents the sole, essential factor required for the appropriate, critical positioning of film chips onto the modified, contact printer. Under total darkness condition, therefore, when a chip of light sensitive film is accessed by its corner 16 in the positioned-referenced manner (relative to the jaws 13) identical to that described above, it can be critically positioned on the pegs 3, 4, 5 of a modified contact printer solely by position-referencing between the slot channel 12 and the forcep's jaws 13. Thus in a direct, efficient, repeatable manner, film chips can be accessed and appropriately positioned in total darkness without resort to fingertip-touch sensing or other physical, hand contact of any kind.

Since, therefore, the three components (1) the slot channel 12; (2) the forcep's jaws 13; and, (3) the film chip corner 16 are the position-referencing determinants for this method of film chip handling in the 35 mm, contact printing process, all equipment (and associated procedures) must be designed around these factors. This includes, in the chronological order of the contact printing process: (1) the functional design of the apparatus for fabricating 35 mm, film chips; (2) the conveying of the film chips to the storage and supply dispenser; (3) the functional design of the dispenser; (4) the accessing of film chips from the dispenser; (5) the functional design of the 35 mm, contact printer; and, (6) the procedures relating to the contact printer.

Since the last two factors dictate all peripheral apparatus and procedures, they have already been dealt with out of chronological, procedural order. The additional considerations will now be detailed in the order in which they are listed above.

The second embodiment of this invention relates to a simple, manually operated cost-effective device, for use under total darkness conditions, for the fabrication of 35 mm, perforated, light sensitive, photographic film in single, registration-frame-size chips from continuous roll, or strip, supply sources, for use in 35 mm, contact printing processes, or other processes where the customary, 35 mm, multiple-frame format cannot be employed. The device permits the fabrication of such film chips without resort to manual, hand or fingertip touch-contact in any manner. Further, the film chips are delivered from the cutting device already position-referenced (in the prerequisite manner already established) for subsequent procedures in the 35 mm, contact printing process.

In order to conform to the registration-frame's standard perforation-holes versus image-area configuration (FIG. 1), the fabrication of such film chips from a multiple frame supply source requires that the severing cuts be made in the middle of the inter-perforation hole space following each sequence of eight perforation holes. Typical transparency frame cutters (FIG. 6) do not take into account this registration-frame requirement in that the frame line between images indicates the appropriate cutting point by visual reference to already processed film. (With customary, 35 mm cameras, the inter-image space on each roll of film is randomly positioned, relative to the perforation holes, largely dependent upon variabilities relating to the initial loading of the film roll into the camera.) Neverthless, these transparency cutters provide most of the essential components for the fabrication of registration-frame film chips. As a result, this embodiment of the invention deals with a component that is permanently affixed to an existing transparency frame cutting apparatus (hereafter referred to as a "transparency cutter".

When the leading end of a roll or strip of 35 mm, perforated film is inserted under the sprocket 18, it is advanced to the cutting platform 19 by turning the film advance knob 20 in a counterclockwise direction and severed at the appropriate point by pressing the cutting blade 21. Such cutting under total darkness conditions requires: (1) the controlled advancing of lengths of film, each containing a standard eight perforation holes (for 35 mm); and, (2) the positioning of the inter-perforation hole space 24 following the eighth perforation hole, for each length of film, at its mid-point relative to the cutting blade 21.

The first of these two prerequisites is addressed when a device with the essential functional characteristics of the modified, 35 mm contact printer (FIG. 3) is appropriately adapted (FIG. 7), positioned, and permanently affixed in the cavity 22 of the transparency cutter. A stop or raised ledge 23 at the final advance extremity of the film's leading edge stops the advance of film pieces 15, each piece containing eight perforation holes. In this advanced position, with the film's leading edge resting against the raised ledge 23, the perforation holes are appropriately aligned above the pegs 3, 4, 5, allowing the bottoming of the perforation holes into the pegs 3, 4, 5 by way of the momentary closing of the upper cover 9. (In this application, the upper cover 9 is used for bottoming purposes only. To prevent its locking in the down position during the bottoming cycle, the latching component 11 is not included in this adaption.)

The second prerequisite (severing the film piece at the required inter-perforation point 24) relates to the positioning of the adapted device, relative to the blade 21, in the cavity 22. The modification of the upper and lower structural body components 1, 9 bares the trailing end of the advanced film piece. The modified device is appropriately distanced and permanently affixed (relative to the cutting platform 19 and blade 21) in such a manner that it presents the required middle of the inter-perforation space 24, after the eighth perforaton hole, to the cutting blade 21. After severing, the piece of film (with its perforation holes still engaged on the pegs 3, 4, 5) presents its accessing corner 16 in the slot channel 12 in the manner established in the first embodiment (FIG. 4). Since this positioning conforms to the established requisites of slot channel 12 versus forceps jaws 13 referencing (hereafter referred to as "slot/jaws referencing"), the film chip can be removed by the forceps from the registration-frame film cutter and directly position-referenced onto the modified contact printer, as already detailed.

As useful as this direct transference procedure might be, in routine contact printing operations, the fabrication of individual film chips on an as-needed basis would represent a significant level of inefficiency. (Just as customary roll film frames present themselves, ready-to-use as required, it is advantageous for the advancement of 35 mm, contact printing that this conventional convenience be mirrored as closely as possible.) As a result, the third embodiment of this invention answers to the need for convenience by making it possible to store a number of film chips in a storage and dispensing device (as an intermediate stage before their use) in such a manner that they can be accessed by the forceps in the slot/jaws referencing mode.

When a fabricated, light sensitive film chip is removed from the registration-frame cutter (under the required total darkness condition) by means of the forceps, in the manner already detailed, it is transferred to a storage and dispensing unit (FIG. 9). The forceps jaws 13 are lowered into the slot channel 25 having the identical position-referencing characteristics as slot channels employed in the first and second embodiment of this invention. Initial referencing of the forcep's left/-right position is provided by the film chip 15 fitting inside the closely sized cavity 26. As the chip 15 is lowered, the protruding, semi-rigid, pointed spindles 27, 28 thread through two perforation holes. The semi-rigid spindles are somewhat smaller than the perforation holes to facilitate the threading process. They are positioned in such a manner that their contact with the inner surfaces of the perforation holes directs two edges of the film chip to rest against the inner surface of the front wall 29 and the side wall 30, when the film chip is released from the forceps.

When the film chip 15 has been threaded onto the spindles 27, 28, the forcep's jaws 13 are released. A spacer 31 is manually threaded onto the spindles 27, 28 which are accessed through the opening 32 in the front wall. Fingertip pressure on the spacer 31 bottoms the film chip 15 to a position on top of other film chips, or to the bottom of the storage cavity. A spacer 31 is spindled on the bottom of the storage cavity 26 before the first film chip. This process of placing each fabricated film chip on the spindles 27, 28, followed by a spacer 31, is repeated until the dispenser is full, or until the desired number of film chips are accumulated.

During 35 mm contact printing procedures, the storage and dispensing unit is removed from its light-tight container, and the ready-to-use film chips are accessed in total darkness on demand. The forcep's jaws 13 are lowered from the top of the slot channel 25 until the position of the topmost film chip and its spacer 31 is sensed. The spacer's leading edge 33 offers initial, coarse, left/right sensing reference to the forceps. Fingertip pressure, through the opening 32 in the dispenser's front wall, exerted on the spacer 31, stabilizes the otherwise loosely layered stack of film chips. The slightly opened forcep's jaws 13 are aligned above and below the accessing corner 16 of the topmost film chip and are moved to the left until they press against the leading edges 33 of the spacers above and below the film chip being accessed. This pressure seats the spacers—opposite ends 34 against the inner surface of the dispenser's wall 30, and provides positive left/right position-referencing to the jaws 13 relative to the accessing corner 16 of the film chip. (The size-to-size slot channel 25 provides comparable referencing for the opposite axis.) The jaws 13 are clamped onto the film chip's corner 16 and secured by the locking mechanism 14. The film chip is removed from the dispenser by raising the forceps upwards and out of the slot channel 25. The spacer is set asie for re-use. The film chip, as clamped in position-reference to the jaws 13, is ready for positioning onto the modified contact printer, by the established slot/jaws method.

This third embodiment of the invention completes the system of apparatus and procedures relying upon the slot/clamp referencing principle. Procedural details relating directly to 35 mm, contact printing processes can now be presented in the context of the total system.

It is the nature of many 35 mm, contact printing processes to employ upwards to several exposures, with each exposure requiring changing of the image-carrying printing elements. Under these circumstances, with the fingertip-touch sensing method, the choice of placing the unexposed film chip onto the registration pegs, as the first component, is generally based upon the preference to handle the light and touch sensitive film chip as little as possible. (If it were the topmost element, it would require removal, after each exposure, to permit the changing of the lower, printing elements.) This continuous presence of the light sensitive film chip at the bottom-most position of the registration pegs necessitates the positioning of all image-carrying elements in total darkness. However, since this invention provides a means for the risk-free, efficient removal after each exposure, and replacement before each exposure, of the light sensitive film chip, the image-carrying, printing elements can always be positioned first under normal lighting conditions. (For the first exposure, the light sensitive film chip is accessed from the dispenser. During the preparation for each subsequent exposure, the forceps with the light sensitive film chip secured in the clamped position are placed in a light-tight storage container.) After each positioning of the printing elements, the light sensitive film chip is positioned as the topmost layer using the slot/clamp referencing in total darkness conditions. However, one factor resulting from this reverse in the customary sequencing of the elements in the 35 mm, contact printing process must be considered.

Using FIG. 4 as reference, when an image-carrying, printing chip 15 is positioned in the contact printer, its corner 16 protrudes into the slot channel 12. As a result of this obstruction, the subsequent slot/clamp referencing of the light sensitive film chip would be impaired. However, since all image-carrying printing chips can now be positioned manually by visual reference in normal lighting conditions, this corner on each printing chip serves no purpose. As a matter of course, it is trimmed from all image-carrying, printing chips.

Since few standards exist for single, registration-frame-size, 35 mm, contact printing devices and procedures, additional configurations of this invention's slot/-clamp referencing principle, answering to a range of specific requirements, is anticipated. As an example, the placing of the light sensitive film chip on top of the image-carrying printing chips dictates light exposure through the lower window 2 only. Certain procedures, processes, or exposure equipment might offer advantages in exposure through the upper window 10. In this regard, the placement of a second slot channel on the corner of the contact printer, directly opposite its location in the first embodiment, affords flexibility in the sequencing of the various elements, as well as the direction from which the elements are exposed.

As the practice of 35 mm, contact and projection printing expands, additional efficiencies in the procedures involved will doubtlessly ensue. As an example, the placing of the image-carrying, printing chips in dispensers, with the accessing characteristics detailed in the third embodiment of this invention, would facilitate the handling of such chips even under normal lighting conditions. The slot/clamp referencing principle even opens the doors to the mechanization, automation, and computer control of complex and repetitive single frame, 35 mm, contact and projection printing processes.

It has been found that the accuracy and ease of positioning the film piece can be increased if the size of the accessing and grasping sector of the chip is increased by moving an end edge of the chip further from the image area. In order that the clamp should not interfere with the image area of the chip, and to increase the grasping sector size, the chip should be made slightly longer than in the embodiment described earlier; it should contain an extension. As the extension can be made as long as desired, the size of the clamping area can be increased relative to that of the previous embodiment. This will allow placement of the clamp jaws to be perpendicular to the side edge of the chip.

Turning to FIG. 10, a film chip according to the second embodiment is illustrated. An image area having length B—B is contained within a film strip bordered by sprocket holes in a customary manner. However in the present invention an extension 35 to the chip is utilized. Conveniently, where the chip would otherwise be bordered by eight sprocket holes, an additional length of film bordered by one sprocket hole on each side can be used. The ends of the chip are located midway between sprocket holes, as before although other standards could be used. The film chip with its extension will be referred to below as the film chip.

FIG. 11 illustrates one form of the invention, being a frame having a base 1 and a cover or lid 9 similar to that described earlier with reference to FIG. 3. The border area of a standard frame is sufficient to accommodate the extension to the chip.

A slot 12 in the base and a corresponding slot 17 in the lid 9 (which, when the lid is closed, forms a single slot) extends from the front of the frame orthogonal to the side edge of the film. This allows the clamp, e.g. the forceps, to grasp the chip in the gripping area 16 of the chip in its extension area, and avoid the image region of the chip located over the window 2. The relationship of the slot, grasping region, and the film chip can be seen more clearly in FIG. 12. Studs or pegs 3, 4, 5 pass through the holes in the film, registering it. There should be at least two studs or pegs passing through two corresponding holes in the film. As noted with respect to the first embodiment, slots, i.e. channels or guides, can be located at both opposite ends of the frame.

It should be noted that in FIGS. 11 and 12 windows for exposure of the chip are shown both in the bottom and the lid. However the chip to be exposed is usually placed on top of the image carrying chips which are positioned on the registration pegs first. Thus the film is exposed through the window 2.

When the preparation procedure employed results in the handling forcepts being obstructed from the slot 12 by the printing elements being used, the film extension on these elements can be cut off. Alternatively, if a second accessing slot identical to slot 12 is located on the opposite side of the frame (FIGS. 11 and 12), the printing elements can be produced in such a manner that the chip extension is on the opposite end of the chips as compared to the receiving chip onto which their images are being printed. In this case the printing elements can be positioned using the second slot and the slot 12 of the original margin side would not be obstructed.

Once processing of the receiving chip has been completed, the chip extension portion can be cut off.

FIGS. 13 and 14 illustrate the film positioning component of the chip cutter, and the chip cutter in isometric view, respectively. FIG. 13 has the studs or pegs in the lid portion. Compare FIGS. 11 and 13; they are very similar except for the locations of the studs or pegs. FIG. 11 depicts a frame with a cover which latches shut, while FIG. 13 does not have such a latching component.

Looking now at FIGS. 13 and 14, and comparing them with FIG. 8, it may be seen that the location of the stop or raised ledge 23 is extended further from the blade 21 in FIG. 14 than in FIG. 8. Thus the chip is cut longer using this embodiment than in the previous; the chip will contain the described extension.

The location of the studs or pegs 3, 4 and 5 in the cover 9 allows the film to be drawn forward to bear against the stop 23 without being impeded by the pegs extending upwardly from a base. When the cover 9 is closed, the studs or pegs are passed through the holes in the film, properly registering its location. In addition, the slots 12 and 17 in the base and cover extend from the side of the base inwardly along and over the extension portion of the chip.

FIG. 15 illustrates an alternative embodiment to the one of FIG. 9. In this embodiment, the channel 25 is on the side of the container which allows the clamp to grasp the film chip orthogonal to the side of the chip, i.e. orthogonal to the axis of the adjacent row of holes, and directly over the extension portion of the chip. The chips are positioned by the closely sized walls of the container.

In this alternative embodiment the spacer 31 (FIG. 15) is made equal in outside dimensions to the film chip, covering the entire film chip surface and occupying the entire dispenser cavity 26 in the same manner as each film chip. That is, each spacer extends to all four internal walls of the dispenser. The upper and lower surface of each spacer has raised margins matching the perforation areas on the chip. These raised margins prevent the spacer from coming into contact with the pressure sensitive, image area of each film chip.

Spacer 31 also contains a slot 12. This slot, in conjunction with the channel 25, provides a guide by which the jaws of the clamp are referenced to the proper position on the film over the extension region.

In summary it should be noted that the location of the slot 12, constituting a guide for locating the chip handling tool, is positioned over a predetermined location on the film chip. In the various embodiments described with reference to FIGS. 3, 4, 7, 8 and 9, the slot 12 for the clamp extends from a forward end of the chip parallel to the axis of a row of holes in the chip, in the border area outside the image region. In the embodiment described with reference to FIGS. 11–15, the location of the guide slot 12 is orthogonal to the film so that the clamp can be placed over an extension portion of the chip. In both cases the chip is automatically positioned in all devices as a result of the clamp being positioned by the guide slot 12 precisely in the same relative position in all instances.

A person understanding this invention may now conceive of alternative embodiments or other designs using the principles described herein. All are considered to be within the sphere and scope of the invention as defined in the claims appended hereto.

I claim:

1. Apparatus for retaining a piece of photographic film (chip) in a predetermined location comprising a chip holder, means for accurately retaining the chip in a predetermined location in the chip holder, and a tool placement referencing guide, the dimensions and shape of said guide corresponding to dimensions and corresponding shape of a chip grasping portion of a chip handling tool, whereby the chip handling tool may be guided at a predetermined and invariably specific accessing and grasping sector of a chip retained in said apparatus.

2. Apparatus as defined in claim 1 in which said sector is in a portion of the chip adjacent to but not protruding into part of the chip reserved for an image.

3. Apparatus as defined in claim 2, including chip retention means covering at least the grasping sector of said chip, the placement reference guide being comprised of a slot therein having such width, depth and position as to precisely locate jaws of the chip handling tool on opposite surfaces of said chip in said grasping sector.

4. Apparatus as defined in claim 2, including chip retention means comprised of a chip retainer havng a pair of opposing stiff plane members clamping parallel to the plane surfaces of the chip, the reference guide being comprised of slots of similar shape extending into the chip clamping members from one edge thereof over said grasping sector of said chip.

5. Apparatus as defined in claim 2, in which the chip handling tool is a forceps-type instrument comprising clamping jaws having gripping surfaces and handles of scissors-type having a locking mechanism whereby said tool when firmly clamped and locked by said mechanism to a chip at said grasping sector maintains said chip immovable relative to said tool.

6. Apparatus as defined in claim 2, in which said grasping sector of said chip is an extension of the chip outside of a portion of the chip reserved for an image, and in which the guide is located concomitantly with said extension.

7. Apparatus as defined in claim 2, in which said chip contains at least two registration holes in a margin area outside a portion of the chip reserved for an image, means for retaining the chip in a predetermined location within said apparatus comprising protrusions projecting through and engaging the boundaries of said holes.

8. Apparatus as defined in claim 7 forming cutting means for cutting film to form said chip further comprising a holder for a supply roll of film, means for advancing a free end of the film forward, a cutting blade for severing the film, and a film stop spaced a distance beyond the cutting blade equal to a required length of the chip, and including at least two of said protrusions located between the film cutting blade and the film stop located to project through and engage with the boundaries with said holes when the film is flat and disposed against the film stop, a pair of opposing stiff plane members clamping parallel to the plane surfaces of the chip, the reference guide being comprised of slots of similar shape extending into the chip clamping members from one edge thereof over said grasping sector of said strip.

9. Apparatus as defined in claim 7 for forming a stacked chip strage and dispensing container comprising an upright rectangular container having an interior cavity sized to define the boundaries of a chip, at least two protrudng spindles extending upwardly from an interior base of said container for extending through at least two holes of each of a plurality of chips for locating at least two adjacent sides of each chip against adjacent interior walls of said container, further including plane chip spacers having holes located so as to fit over the spindles in similar manner as said chips and to separate said chips, a side of the box containing a vertical slot for providing access for jaws of said chip handling tool, the chip spacers each having a similarly shaped and located slot extending into the spacer from one edge thereof adjacent to the vertical slot and over said grasping sector of said chip.

10. Apparatus as defined in claim 7 for forming a contact and projection printer comprising base and cover components forming a retaining frame for one or more of said chips, the base thereof containing at least two protrusions for projecting through and engaging the boundaries of said holes in the chip, further comprising a window aperture in at least the base component having a size of at least the portion of the chip reserved for the image, reliefs in at least the cover for accommodating the protrusions, whereby the base and cover can be tightly held against the chip, the base and cover both containing slots forming said placement referencing guide to locate grasping jaws of said tool on opposite sides of the chip over said grasping sector whether the base and cover are either together or apart.

11. Apparatus as defined in claim 7 for cutting film to form said chip further comprising a holder for a supply roll of film, means for advancing a free end of the film forward, a cutting blade located crossways to the advanced film for severing the film, and a film stop spaced a distance beyond the cutting blade equal to a required length of the chip plus an extension for forming said grasping sector, a pair of opposing stiff plane members for clamping said chip parallel to the plane surfaces of the chip to said apparatus, the reference guide being comprised of aligned slots of similar shape extending into the chip clamping members from one edge thereof over said grasping sector of said strip.

12. Apparatus as defined in claim 7, including chip retention means covering at least the grasping sector of said chip, the placement reference guide being comprised of a slot therein having such width, depth and position as to precisely locate jaws of the chip handling tool on opposite surfaces of said chip in said grasping sector.

13. Apparatus as defined in claim 7, including chip retention means comprised of a chip retainer having a pair of opposing stiff plane members clamping parallel to the plane surfaces of the chip, the reference guide being comprised of slots of similar shape extending into the chip clamping members from one edge thereof over said grasping sector of said chip.

14. Apparatus as defined in claim 7, in which the chip handling tool is a forceps-type instrument comprising clamping jaws having gripping surfaces and handles of scissors-type havng a locking mechanism whereby said tool when firmly clamped and locked by said mechanism to a chip at said grasping sector maintains said chip immovable relative to said tool.

15. Apparatus as defined in claim 7, in which said grasping sector of said chip is an extension of the chip outside of a portion of the chip reserved for an image, and in which the guide is located concomitantly with said extension.

16. Apparatus as defined in claim 1, including chip retention means covering at least the grasping sector of said chip, the placement reference guide being comprised of a slot therein having such width, depth and position as to precisely locate jaws of the chip handling tool on opposite surfaces of said chip in said grasping sector.

17. Apparatus as defined in claim 1, including chip retention means comprised of a chip retainer having a pair of opposing stiff plane members clamping parallel to the plane surfaces of the chip, the reference guide being comprised of slots of similar shape extending into the chip clamping members from one edge thereof over said grasping sector of said chip.

18. Apparatus as defined in claim 1, in which the chip handling tool is a forceps-type instrument comprising clamping jaws having gripping surfaces and handles of scissors-type having a locking mechanism whereby said tool when firmly clamped and locked by said mechanism to a chip at said grasping sector maintains said chip immovable relative to said tool.

19. Apparatus as defined in claim 1 for storing and dispensing stacked chips in which said grasping section of said chip is an extension of the chip outside of a portion of the chip reserved for an image, the apparatus comprising an upright rectangular container having an interior cavity sized to the boundaries of a chip, further including spacers having similar plane dimensions as the chips for separating each chip stacked within the apparatus, each spacer containing a guide slot extending from one edge leaving uncovered said sector when stacked over a chip, a side of the container containing a vertical slot forming said guide for providing access to the chips by a chip handling tool, whereby clamping jaws of the chip handling tool can be directed to said sector.

20. Apparatus as defined in claim 1, in which said grasping sector of said chip is an extension of the chip outside of a portion of the chip reserved for an image, and in which the guide is located concomitantly with said extension.

21. Apparatus for handling a piece or photographic film (chip) comprising:
 (a) a chip handling tool in the form of a forceps-type instrument, for grasping said chip and maintaining said chip immovable relative to said tool, (b) means for cutting a supply of film to form said chip, said cutting means including a reference guide for the tool to locate the gripping surfaces of the tool over opposing surfaces of the chip over a predetermined grasping sector, whereby said chip may be removed from said cutting means by means of said tool grasping the grasping sector, (c) a contact and projection printer comprising base and cover components forming a retaining clamp for one or more of said chips, a window aperture in at least the base component having a size of at least the portion of the chip reserved for an image, the base and cover components both containing aligned slots forming a placement referencing guide to locate the gripping surface of the tool over opposing surfaces of the chip over the predetermined grasping sector, whether the base and cover are either together or apart, whereby the tool can grasp the chip at the grasping sector in said cutting means and place it in said printer at a precise location defined by the location of said guide and said tool or retrieve it from the printer, always grasping the chip in precisely the same grasping location.

22. Apparatus for handling a piece of photographic film (chip) comprising:

(a) a chip handling tool having a chip grasping portion, for maintaing said chip immovable relative to said tool, (b) a plurality of chip retaining means each including means for retaining a chip, and a placement referencing guide for guiding said tool to a common, predetermined and invariably specific accessing and grasping sector of any chip retained in the retaining means, whereby when the jaws of said tool are firmly engaged with a chip the parameters of position orientation between said chip and said jaws define an unique location interrelationshp between said chip and said jaws, such that when the chip is removed from a first chip retaining means by said tool, said jaws when position referenced within the guide of a second chip retaining means restores the film piece to a location and position relationship relative to the second chip retaining means similar to that of said first chip retaining means.

23. A method of handling film pieces for contact and reproduction processes comprising:

(a) storing one or a plurality of unexposed film pieces (chips) containing at least two registration holes in a dispensing container having a clamp guide located to position a clamp at a predetermined and invariably specific accessing and grasping sector of said chip retained within said container, (b) positioning an image carrying chip containing registration holes into an exposure frame having protrusions positioned to extend through the holes of the image carrying chip, over a window in the frame, (c) positioning a clamp in the guide of the dispensing container and grasping an unexposed chip over said sector.

(d) removing the grasped chip from the dispensing first container, (e) disposing the unexposed chip into the exposure frame over the image carrying chip by positioning the clamp in the guide of the frame, the protrusions extending into its registration holes, (f) closing the frame, securing the chips in position, bottomed onto the protrusions, (g) exposing the unexposed chip to light through the window and the image carrying chip, (h) removing the exposed chip.

24. A method as defined in claim 23, including the steps, prior to step (a), of (i) cutting the film to a predetermined length in a chip cutter to form a film chip, each chip containing at least two registration holes, (ii) positioning said clamp in a guide whereby the clamp is located over said grasping sector, and grasping said chip over said sector by means of said clamp, (iii) lifting the chip away from the chip cutter, and in which step (a) is comprised of:

(iv) positioning the clamp in the guide of the dispensing container containing at least two vertical spindles located to engage the holes in said chip and moving the chip as directed by the guide to a predetermined location for retention within the container, with the spindles extending through the holes in said chip, (v) unlocking the clamp to release the chip within the container, (vi) placing a spacer on top of said chip.

25. A method of handling film pieces for contact and projection reproduction processes comprising:

(a) storing one or a plurality of unexposed film pieces (chips) in a storage and dispensing container having a clamp guide located to position a clamp at a predetermined and invariably specific accessing and grasping sector of said chip retained within said container, (b) positioning an image carrying chip containing registration holes into an exposure frame having protrusions positioned to extend through the holes of the image carrying chip, over a window in the frame, (c) positioning a clamp in the guide of the dispensing container and grasping an unexposed chip over said sector.

(d) removing the grasped chip from the dispensing container, (e) disposing the unexposed chip into the exposure frame over the image carrying chip by positioning the clamp in the guide of the frame, (f) closing the frame, securing the chips in position bottomed on the protrusions, (g) exposing the unexposed chip to light through the window and the image carrying chip, (h) removing the exposed chip.

26. A method as defined in claim 25, including the steps, prior to step (a), of (i) cutting the film to a predetermined length in a chip cutter to form a film chip, (ii) positioning said clamp in a guide whereby the clamp is located over said grasping sector, and grasping said chip over said sector by means of said clamp, (iii) lifting the chip away from the chip cutter, and in which step (a) is comprised of:

(iv) positioning the clamp in the guide of the storage and dispensing container and moving the chip as directed by the guide to a predetermined location for retention within the container, (v) unlocking the clamp to release the chip within the container, (vi) placing a spacer on top of said chip.

27. A method as defined in claim 26 including cutting the film in step (i) to a length which includes an extension to the chip outside an unexposed image area constituting the grasping sector.

28. Apparatus for retaining a piece of photographic film (chip) in predetermined locations comprising a plurality of chip holders, each comprising means for accurately retaining a chip in a predetermined location, each holder having a tool positioning guide located in a similar predetermined position relative to the chip retaining means, the tool positioning guides each having similar dimensions and shape corresponding to dimensions and corresponding shape of a chip grasping portion of a chip handling tool, whereby the chip grasping portion may be guided to a predetermined and invariably specific accessing and grasping sector of any chip retained in any of said holders.

29. Apparatus for forming a contact and projection printer, for position referencing a piece of photographic film (chip) in a predetermined location relative to and within said apparatus, said apparatus comprising a placement referencing guide for guiding a chip handling tool to a predetermined and invariably specific accessing and grasping sector of said chip retained within said apparatus, said sector being in a portion of the chip adjacent to but not protruding into part of the chip reserved for an image, the chip being of a form containing at least two registration holes in a margin area outside a portion of the chip reserved for an image, and further comprising base and cover components forming a retaining frame for one or more of said chips, the base thereof containing at least two protrusions for projecting through and engaging the boundaries of said holes in the chip, further comprising a window aperture in at least the base component having a size of at least the portion of the chip reserved for the image, reliefs in at least the cover for accommodating the protrusions, whereby the base and cover can be tightly held against the chip, the base and cover both containing slots forming said placement referencing guide to locate grasping jaws of said tool on opposite sides of the chip over said grasping sector whether the base and cover are either together or apart.

30. Apparatus as defined in claim 29, in which the chip handling tool is a forceps-type instrument comprising clamping jaws having gripping surfaces and handles of scissors-type having a locking mechanism whereby said tool when firmly clamped and locked by said mechanism to a chip at said grasping sector maintains said chip immovable relative to said tool.

* * * * *